United States Patent
Lee et al.

(10) Patent No.: US 11,072,054 B2
(45) Date of Patent: Jul. 27, 2021

(54) JIG ASSEMBLY AND METHOD OF MANUFACTURING DISPLAY DEVICE USING THE SAME

(71) Applicant: Samsung Display Co., Ltd., Yongin-Si (KR)

(72) Inventors: Jung Il Lee, Bucheon-si (KR); Kyu Tae Park, Hwaseong-si (KR); Ji Heon Lee, Busan (KR); Sang Sun Han, Suwon-si (KR)

(73) Assignee: Samsung Display Co., Ltd.

( * ) Notice: Subject to any disclaimer, the term of this patent is extended or adjusted under 35 U.S.C. 154(b) by 176 days.

(21) Appl. No.: 16/057,614

(22) Filed: Aug. 7, 2018

(65) Prior Publication Data

US 2019/0299369 A1 Oct. 3, 2019

(30) Foreign Application Priority Data

Mar. 29, 2018 (KR) ........................ 10-2018-0036495

(51) Int. Cl.
| | |
|---|---|
| *B25B 11/02* | (2006.01) |
| *B25B 5/00* | (2006.01) |
| *B25B 5/10* | (2006.01) |
| *B25B 5/14* | (2006.01) |
| *B25B 5/16* | (2006.01) |
| *G02F 1/1343* | (2006.01) |
| *G02F 1/1335* | (2006.01) |
| *G02F 1/1333* | (2006.01) |

(52) U.S. Cl.
CPC ............. *B25B 11/02* (2013.01); *B25B 5/003* (2013.01); *B25B 5/10* (2013.01); *B25B 5/14* (2013.01); *B25B 5/16* (2013.01); *G02F 1/1343* (2013.01); *G02F 1/133512* (2013.01); *G02F 1/133514* (2013.01); *G02F 1/133528* (2013.01); *G02F 1/133357* (2021.01); *G02F 1/134318* (2021.01)

(58) Field of Classification Search
CPC ......... B25B 5/02; B25B 5/003; B25B 5/1014; B25B 11/00; B25B 11/02; G02F 2001/133325
USPC ....... 269/17, 37, 136, 137, 138, 289 R, 309, 269/310, 903, 905
See application file for complete search history.

(56) References Cited

U.S. PATENT DOCUMENTS

| | | | |
|---|---|---|---|
| 3,643,935 A * | 2/1972 | Bell ................. | E04F 21/0023 269/16 |
| 3,730,511 A * | 5/1973 | Caras ................. | B25B 5/10 269/152 |
| 7,014,180 B1* | 3/2006 | Harrison ............. | B25B 5/003 269/17 |
| 9,712,780 B2 | 7/2017 | Oya et al. | |

FOREIGN PATENT DOCUMENTS

KR  10-2016-0135616 A   11/2016

* cited by examiner

*Primary Examiner* — Monica S Carter
*Assistant Examiner* — Alberto Saenz
(74) *Attorney, Agent, or Firm* — Innovation Counsel LLP

(57) ABSTRACT

Jig assembly and method of manufacturing display device are provided. there is provided a jig assembly, including: an outer frame in which a hollow portion is defined; a support across the hollow portion; a movable cover coupled with the outer frame to expose the hollow portion; a fixed cover fixed to the outer frame; and a pressure bar disposed inside the outer frame and moving by a predetermined distance.

15 Claims, 10 Drawing Sheets

JIG ASSEMBLY AND METHOD OF MANUFACTURING DISPLAY DEVICE USING THE SAME

This application claims priority from Korean Patent Application No. 10-2018-0036495, filed on Mar. 29, 2018, in the Korean Intellectual Property Office, the disclosure of which is incorporated herein by reference in its entirety.

BACKGROUND

1. Field of the Invention

The present invention relates to a jig assembly and a method of manufacturing a display device using the same.

2. Description of the Related Art

The importance of a display device has increased with the development of multimedia. Accordingly, various types of display devices such as a liquid crystal display (LCD) and an organic light emitting display (OLED) have been used.

Among display devices, a liquid crystal display device, which is one of the most widely used flat panel display devices, includes two substrates including electric field generating electrodes such as a pixel electrode and a common electrode and a liquid crystal layer disposed therebetween. In the liquid crystal display device, a voltage is applied to the electric field generating electrodes to form an electric field in the liquid crystal layer, so that the alignment of liquid crystal molecules in the liquid crystal layer is determined, and the polarization of incident light is controlled, thereby displaying an image.

The liquid crystal display device receives light from a light source and displays an image. That is, in order to drive the liquid crystal display device, a light source is required, so that a housing for accommodating the light source and related components, or the like, is inevitably required.

SUMMARY

An aspect of the present invention is to provide a jig assembly, which can simplify a process.

Another aspect of the present invention is to provide a method of manufacturing a display device, by which a process can be simplified.

Still another aspect of the present invention is to provide a method of manufacturing a display device having a narrow bezel.

According to an aspect of the present invention, there is provided a jig assembly, including: an outer frame in which a hollow portion is defined; a support across the hollow portion; a movable cover coupled with the outer frame to expose the hollow portion; a fixed cover fixed to the outer frame; and a pressure bar disposed inside the outer frame and moving by a predetermined distance.

According to another aspect of the present invention, there is provided a method of manufacturing a display device, including: preparing an assembly including a display panel and a first sub-top chassis disposed on a first side surface of the display panel; forming a first adhesive layer on a second sub-top chassis; attaching the second sub-top chassis to a second side surface facing the first side surface; fixing the assembly provided with the second sub-top chassis using a jig assembly including a movable cover; curing the first adhesive layer; detaching the movable cover; forming a second adhesive layer on the first side surface of the display panel; and attaching the movable cover and curing the second adhesive layer.

However, aspects of the present invention are not restricted to the one set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
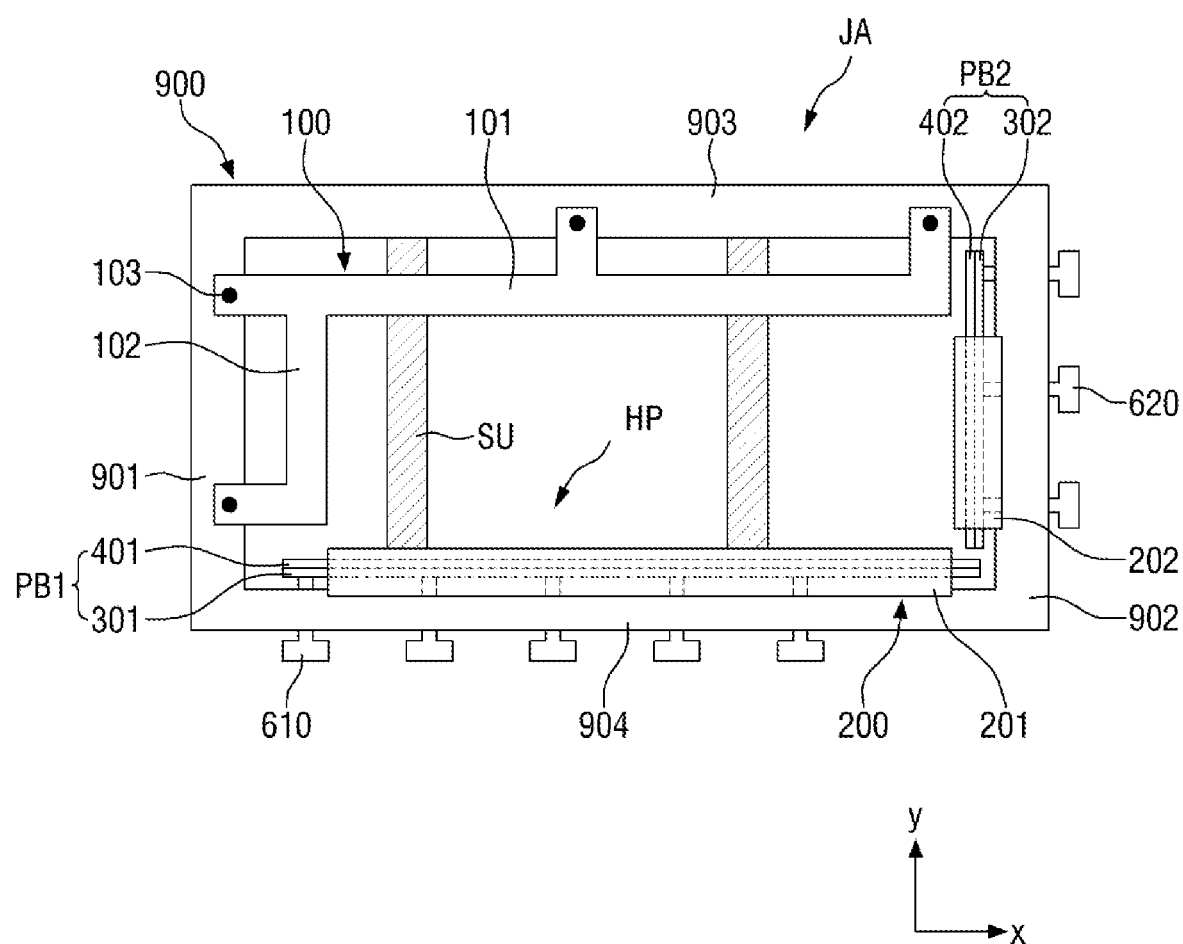
FIG. 1 is a plan view of a jig assembly according to an embodiment of the present invention.

The advantages and features of the invention and methods for achieving the advantages and features will be apparent by referring to the embodiments to be described in detail with reference to the accompanying drawings. However, the invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

Where an element is described as being related to another element such as being "on" another element or "located on" a different layer or a layer, includes both a case where an element is located directly on another element or a layer and a case where an element is located on another element via another layer or still another element. In contrast, where an element is described as being is related to another element such as being "directly on" another element or "located directly on" a different layer or a layer, indicates a case where an element is located on another element or a layer with no intervening element or layer therebetween. In the entire description of the invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present invention will be described with reference to the attached drawings.

FIG. 1 is a plan view of a jig assembly according to an embodiment of the present invention.

Referring to FIG. 1, a jig assembly according to an embodiment of the present invention includes an outer frame 900, a support SU, a movable cover 100, a fixed cover 200, and pressure bars PB1 and PB2.

In the outer frame 900, a hollow portion HP may be defined. The hollow portion HP may be defined as an inner space defined by the outer frame 900. That is, the outer frame 900 may have a hollow frame shape. The outer frame 900 may be disposed to surround the rim of a display device DD to be described later. Specifically, the display device DD is disposed in the hollow portion HP, so that the outer frame 900 may be disposed to surround the side surface of the display device DD.

In an embodiment, the planar shape of the outer frame 900 may be a hollow rectangular shape. However, this intends to correspond to a display device DD having a rectangular outer periphery. When the outer periphery of the display device DD includes a curve, the planar shape of the outer frame 900 may include a curve corresponding thereto.

In an embodiment, the outer frame 900 may be made of a metal material. The metal material may include, for example, aluminum and/or stainless steel (SUS). However, this is illustrative, and the material of the outer frame 900 is not limited thereto. In another embodiment, the outer frame 900 may be made of ceramic or plastic.

In an embodiment, the outer frame 900 may include a first sub-outer frame 901, a second sub-outer frame 902, a third sub-outer frame 903 and a fourth sub-outer frame 904. In other words, the outer frame 900 may be formed by assembling the first sub-outer frame 901, the second sub-outer frame 902, the third sub-outer frame 903, and the fourth sub-outer frame 904.

In an embodiment, two or more selected from the first sub-outer frame 901, the second sub-outer frame 902, the third sub-outer frame 903, and the fourth sub-outer frame 904 may be integrally formed.

In another embodiment, the first sub-outer frame 901, the second sub-outer frame 902, the third sub-outer frame 903, and the fourth sub-outer frame 904 may be independently formed, and then coupled with each other.

In an embodiment, the first sub-outer frame 901 and the second sub-outer frame 902 may face each other, and the third sub-outer frame 903 and the fourth sub-outer frame 904 may face each other.

That is, the first sub-outer frame 901 and the second sub-outer frame 902 may extend in parallel with each other, and the third sub-outer frame 903 and the fourth sub-outer frame 904 may extend in parallel with each other.

In an embodiment, the first sub-outer frame 901 and the second sub-outer frame 902 may have the same length as each other, and the third sub-outer frame 903 and the fourth sub-outer frame 904 may have the same length as each other.

FIG. 1 illustrates a case where the first sub-outer frame 901 and the third sub-outer frame 903 have different lengths from each other, but the present invention is not limited thereto.

In another embodiment, the first sub-outer frame 901 and the third sub-outer frame 903 may have the same length as each other. In still another embodiment, unlike FIG. 1, the third sub-outer frame 903 may be longer than the first sub-outer frame 901.

The support SU may be coupled with the lower portion of the outer frame 900. The support SU may be disposed across the hollow portion HP. In an embodiment, the support SU extends in the Y-axis direction, and at least one support SU may be disposed.

FIG. 1 illustrates a case where two supports SU extend in the y-axis direction. However, the present invention is not limited thereto, and in another embodiment, the support SU may extend in the x-axis.

In another embodiment, the support SU extending in the x-axis direction and the support SU extending in the y-axis direction may be disposed to intersect each other.

In still another embodiment, the support SU may extend in an oblique direction.

The support SU may overlap a part of the hollow portion HP, and may have a bar shape extending in the length direction. The support SU may support the display device DD to be described later under the outer frame 900. That is, the display device DD may be safely placed on the support SU.

In an embodiment, the support SU may be made of a metal material. The metal material may include, for example, at least one selected from iron, aluminum, and stainless steel.

However, this is illustrative, and the material of the support SU is not limited thereto. In another embodiment, the support SU may be made of a non-metallic material such as ceramic or plastic.

The fixed cover 200 and the movable cover 100 may be disposed on the outer frame 900.

The fixed cover 200 may partially overlap the outer frame 900 and the hollow portion HP. Specifically, a part of the fixed cover 200 may contact and overlap the outer frame 900, and the remaining part of the fixed cover 200 may overlap the hollow portion HP.

In an embodiment, the fixed cover 200 may be made of a metal material or a non-metallic material. The metal material may include, for example, at least one selected from iron, aluminum, and stainless steel. The non-metallic material may include, for example, ceramic or plastic.

The fixed cover 200 may be coupled with the outer frame 900. The fixed cover 200 is fixedly coupled with the outer frame 900, and the coupling method is not limited. For example, the fixed cover 200 may be welded to the outer frame 900 or coupled with the outer frame 900 through a separate coupling member.

Further, in another embodiment, the fixed cover 200 may be formed integrally with the outer frame 900.

In an embodiment, the fixed cover 200 may include a first sub-fixed cover 201 and a second sub-fixed cover 202.

The first sub-fixed cover 201 may overlap the fourth sub-outer frame 904, and the second sub-fixed cover 202 may overlap the second sub-outer frame 902.

In an embodiment, the first sub-fixed cover 201 may extend in a direction parallel to the fourth sub-outer frame 904, and the second sub-fixed cover 202 may extend in a direction parallel to the second sub-outer frame 902.

That is, as shown in FIG. 1, in the embodiment in which the fourth sub-outer frame 904 extends in the x-axis direction, the first sub-fixed cover 201 may extend in the x-axis direction. Further, in the embodiment in which the second sub-outer frame 902 extends in the y-axis direction, the second sub-fixed cover 202 may extend in the y-axis direction in parallel with the second sub-outer frame 902.

The movable cover 100 may be disposed on the outer frame 900. The movable cover 100 may partially overlap the outer frame 900 and the hollow portion HP. Specifically, a part of the movable cover 100 may contact and overlap the outer frame 900, and the remaining part of the movable cover 100 may overlap the hollow portion HP. That is, the movable cover 100 is coupled with the outer frame 900, but may expose the hollow portion HP.

In an embodiment, the movable cover 200 may be made of a metal material or a non-metallic material. The metal material may include, for example, at least one selected from iron, aluminum, and stainless steel. The non-metallic material may include, for example, ceramic or plastic.

The movable cover 100 may be detachably coupled with the outer frame 900.

As described in the process to be described later, this configuration exhibits an effect of simplifying process steps. Details thereof will be described later.

In an embodiment, the movable cover 100 may be coupled with the outer frame 900 through a coupling screw 103. In this case, a user may fix the movable cover 100 and the outer frame 900 by using the coupling screws 103 or may separate the movable cover 100 and the outer frame 900 from each other by using the coupling screws 103.

In an embodiment, the movable cover 100 may include a first sub-movable cover 101 and a second sub-movable cover 102. In an embodiment, the first sub-movable cover 101 may overlap the hollow portion HP, and may extend in a direction parallel to the third sub-outer frame 903. That is, as shown in FIG. 1, in the embodiment in which the third sub-outer frame 903 extends in the x-axis, the first sub-movable cover 101 may have a bar shape extending in the x-axis.

Similarly, the second sub-movable cover 102 may overlap the hollow portion HP, and may extend in a direction parallel to the first sub-outer frame 901. That is, as shown in FIG. 1, in the embodiment in which the first sub-outer frame 901 extends in the y-axis, the second sub-movable cover 102 may have a bar shape extending in the y-axis.

In an embodiment, the first sub-movable cover 101 and the second sub-movable cover 102 may be connected to each other. Specifically, the first sub-movable cover 101 and the second sub-movable cover 102 may be formed independently of each other and then coupled together, or may be integrally formed.

FIG. 1 illustrates a case where the first sub-movable cover 101 and the second sub-movable cover 102 integrally formed, but the present invention is not limited thereto.

In another embodiment, the first sub-movable cover 101 and the second sub-movable cover 102 may be separated from each other without being connected to each other.

In an embodiment, the first sub-movable cover 101 may be detachably coupled with the third sub-outer frame 903, and the second sub-movable cover 102 may be detachably coupled with the first sub-outer frame 901.

Since the coupling method is the same as that described above, a detailed description thereof will be omitted.

Referring to FIG. 1 again, in an embodiment, the jig assembly may include the pressure bars PB1 and PB2. For convenience of explanation, these pressure bars PB1 and PB2 will be referred to as a first pressure bar PB1 and a second pressure bar PB2.

The first pressure bar PB1 may extend in a direction parallel to the fourth sub-outer frame 904. That is, in the embodiment in which the fourth sub-outer frame 904 extend in parallel to the x-axis direction, the first pressure bar PB1 may have a bar shape extending in parallel to the x-axis direction.

In an embodiment, the first pressure bar PB1 may at least partially overlap the first sub-fixed cover 201.

In an embodiment, the first pressure bar PB1 may move in the y-axis direction at a predetermined distance. Thus, the first pressure bar PB1 may press the side surface of a target object disposed in the hollow portion HP.

For movement, the jig assembly may include a plurality of first moving screws 610. The first moving screw 610 may pass through the outer frame 900 and contact the first pressure bar PB1.

Further, the first moving screw 610 may extend in a direction orthogonal to the first pressure bar PB1. That is, in FIG. 1, the first moving screw 610 may extend in the y-axis.

The first moving screw 610 may advance or retract to move the first pressure bar PB1 forward or backward. That is, one end of the first moving screw 610 may be coupled to the first pressure bar PB1 to guide the movement of the first pressure bar PB1.

Specifically, when the first moving screw 610 advances, the first pressure bar PB1 may move forward, and similarly, when the first moving screw 610 retracts, the first pressure bar PB1 may move backward.

In another embodiment, the first moving screw 610 may be replaced by a moving pin or the like. Further, the first moving screw 610 may include a spring or the like for smooth movement and pressing.

In an embodiment, the first pressure bar PB1 may include a first supporting portion 301 and a first cushion portion 401.

The first supporting portion 301 may be made of a rigid material to maintain the shape of the first pressure bar PB1. In order to have rigidity, the first supporting portion 301 may be made of a metal material. The metal material may include, for example, at least one selected from iron, aluminum, and stainless steel.

The first supporting portion 301 may be contacted and coupled with the first moving screw 610. Accordingly, the first supporting portion 301 may move according to the movement of the first moving screw 610 as described above.

The first cushion portion 401 may extend along the first supporting portion 301, and may cover the first supporting portion 301. The first cushion portion 401 may be in direct contact with a target object (corresponding to a display device or the like to be described later) disposed in the hollow portion HP.

The first cushion portion 401 may be made of an elastic material such as rubber or urethane. When the first cushion portion 401 is made of an elastic material, it is possible to prevent a target object from being damaged by reducing an impact caused by the contact with the target object.

The second pressure bar PB2 may extend in a direction parallel to the second sub-outer frame 902. That is, in the embodiment in which the second sub-outer frame 902 extend in parallel to the y-axis direction, the second pressure bar PB2 may have a bar shape extending in parallel to the y-axis direction.

In an embodiment, the second pressure bar PB2 may at least partially overlap the second sub-fixed cover 202.

In an embodiment, the second pressure bar PB2 may move in the x-axis direction at a predetermined distance. Thus, the second pressure bar PB2 may press the side surface of a target object disposed in the hollow portion HP.

For movement, the jig assembly may include a plurality of second moving screws 620. The second moving screw 620 may pass through the outer frame 900 and contact the second pressure bar PB2.

Further, the second moving screw 620 may extend in a direction orthogonal to the second pressure bar PB2. That is, in FIG. 1, the second moving screw 620 may extend in the x-axis.

The second moving screw 620 may advance or retract to move the second pressure bar PB2 forward or backward. That is, one end of the second moving screw 620 may be coupled to the second pressure bar PB2 to guide the movement of the second pressure bar PB2.

Specifically, when the second moving screw 620 advances, the second pressure bar PB2 may move forward, and similarly, when the second moving screw 620 retracts, the second pressure bar PB2 may move backward.

In another embodiment, the second moving screw 620 may be replaced by a moving pin or the like. Further, the second moving screw 620 may include a spring or the like for smooth movement and pressing.

In an embodiment, the second pressure bar PB2 may include a second supporting portion 302 and a second cushion portion 402.

The second supporting portion 302 may be made of a rigid material to maintain the shape of the second pressure bar PB2. In order to have rigidity, the second supporting portion 302 may be made of a metal material. The metal material may include, for example, at least one selected from iron, aluminum, and stainless steel.

The second supporting portion 302 may be contacted and coupled with the second moving screw 620. Accordingly, the second supporting portion 302 may move according to the movement of the second moving screw 620 as described above.

The second cushion portion 402 may extend along the second supporting portion 302, and may cover the second supporting portion 302. The second cushion portion 402 may be in direct contact with a target object (corresponding to a display device or the like to be described later) disposed in the hollow portion HP.

The second cushion portion 402 may be made of an elastic material such as rubber or urethane. When the second cushion portion 402 is made of an elastic material, it is possible to prevent a target object from being damaged by reducing an impact caused by the contact with the target object.

The jig assembly (JA) according to an embodiment of the present invention may fix a target object. In an embodiment, the target object may be a display device DD. That is, in an embodiment, the jig assembly may fix a display device DD. Hereinafter, a display device DD as a target object will be described in detail.

Figure 2:
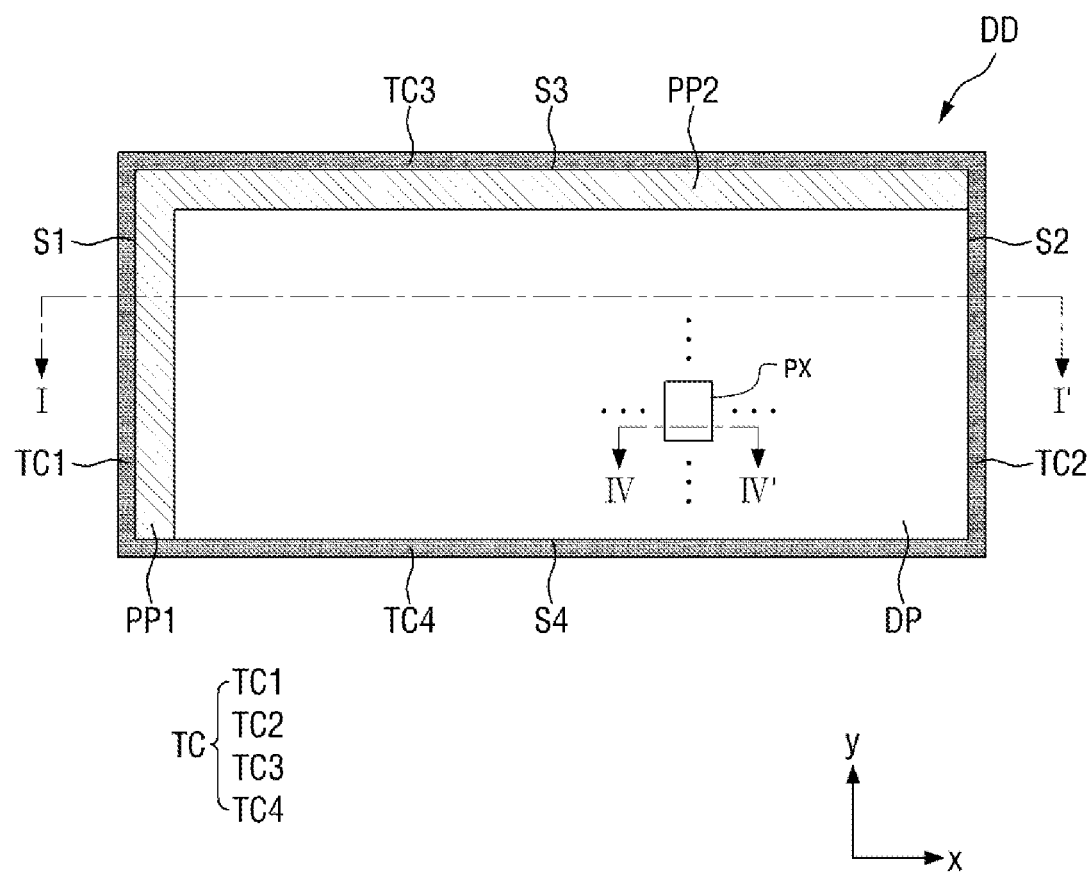
FIG. 2 is a plan view of a display device according to an embodiment of the present invention.
Figure 3:
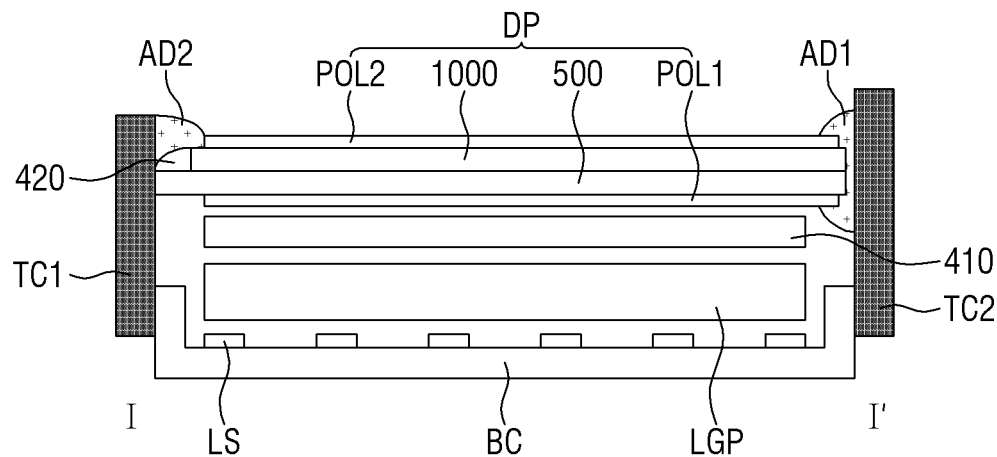
FIG. 3 is a cross-sectional view taken along the line I-I' in FIG. 2.

FIG. 2 is a plan view of a display device according to an embodiment of the present invention. FIG. 3 is a cross-sectional view taken along the line I-I' in FIG. 2.

Referring to FIGS. 2 and 3, the display device DD may include a bottom chassis BC, a top chassis TC, a light source LS, a light guide plate LGP, an optical function layer 410, and a display panel DP.

One surface of the bottom chassis BC may be open, and the bottom chassis BC may include a bottom surface. The bottom surface of the bottom chassis BC may partition a certain space, and may provide a space in which various components to be described later are arranged.

The light guide plate LGP may be disposed over the bottom chassis BC. The light guide plate LGP may serve to guide light provided from the light source LS and provide the light to the display panel DP.

In an embodiment, the light guide plate LGP may be made of glass or plastic.

The light source LS may provide light to the light guide plate LGP. In an embodiment, the light source LS may include a plurality of point light sources or line light sources.

In an embodiment, the light source LS may be a light emitting diode (LED).

The plurality of light sources LS (LEDs) may be mounted on a printed circuit board (not shown).

The light source LS, as shown in FIG. 3, may be a top emission light source that emits light upward. That is, the light source LS may be a direct-type light source that provides light toward the top surface of the light guide plate LGP.

In another embodiment, the light source LS may be a side emission light source that emits light laterally.

That is, the light source LS may be an edge-type light source that provides light toward the side surface of the light guide plate LGP.

The optical function layer 410 may be disposed over the upper surface of the light guide plate LGP. In FIG. 3, the optical function layer 410 is shown as a single layer for convenience of explanation, but the present invention is not limited thereto.

That is, the optical function layer 410 may be a single layer having a plurality of functions, but in another embodiment, the optical function layer 410 may be a laminate in which a plurality of layers are stacked. For example, the optical function layer 410 may include at least one selected from a prism film, a diffusion film, a micro lens film, a lenticular film, a polarizing film, a reflective polarizing film, and a retardation film.

The display panel DP may be disposed on the optical function layer 410. The display panel DP may include a first substrate 500 and a second substrate 1000, which face each other.

The display panel DP may be disposed on the optical function layer 410 and may display an image using light provided from the light source LS. Examples of the light-receiving display panel that displays an image on a screen in this way may include a liquid crystal display panel and an electrophoretic panel. Hereinafter, a liquid crystal display panel is exemplified as the display panel, but various other light-receiving display panels may be applied without being limited thereto.

The display panel DP may include a first substrate 500 and a second substrate 1000, which face each other.

The first substrate 500 and the second substrate 1000 may overlap each other. In an embodiment, the sizes of the first substrate 500 and the second substrate 1000 may be different from each other. FIG. 2 illustrates a case where the first substrate 500 is larger than the second substrate 1000, but the present invention is not limited thereto. In another embodiment, the first substrate 500 may be smaller than the second substrate 1000.

In an embodiment, the display panel DP may include four side surfaces. The four side surfaces may include a first side surface S1, a second side surface S2, a third side surface S3, and a fourth side surface S4.

As described above, since the areas of the first substrate 500 and the second substrate 1000 are different from each other, some of the side surfaces may be formed of the first substrate 500 and the second substrate 1000, and others thereof may be formed of only the first substrate 500 (when the first substrate 500 is larger than the second substrate 1000).

In an embodiment, as shown in FIG. 2, the first side surface S1 and the third side surface S3 may be formed of the first substrate 500, and the second side surface S2 and the fourth side surface S4 may be formed of the first substrate 500 and the second substrate 1000. That is, the first substrate 500 and the second substrate 1000 may be aligned with each other on the second side surface S2 and the fourth side surface S4.

Various signal lines for driving the display panel DP may be disposed on a portion where the first substrate 500 and the second substrate 1000 do not overlap each other.

In an embodiment, the portion where the first substrate 500 and the second substrate 1000 do not overlap each other may include a first pad portion PP1 and a second pad portion PP2.

The first pad portion PP1 may be disposed adjacent to the first side surface S1, and may extend in the y-axis direction. The second pad portion PP2 may be disposed adjacent to the third side surface S3, and may extend in the x-axis direction.

A plurality of signal lines and a plurality of pads may be disposed on the first pad portion PP1 and the second pad portion PP2.

In an embodiment, at least one circuit film (not shown) may be attached onto the first pad portion PP1 and the second pad portion PP2. The circuit film has flexibility, and may be attached to the plurality of pads disposed on the first pad portion PP1 and the second pad portion PP2 through an anisotropic conductive film (ACF). A cover portion 420 may be disposed on the first pad portion PP1 and/or the second pad portion PP2. The cover portion 420 may at least partially cover the first pad portion PP1 and/or the second pad portion PP2.

The cover portion 420 may serve to protect the first pad portion PP1 and the second pad portion PP2.

Figure 4:
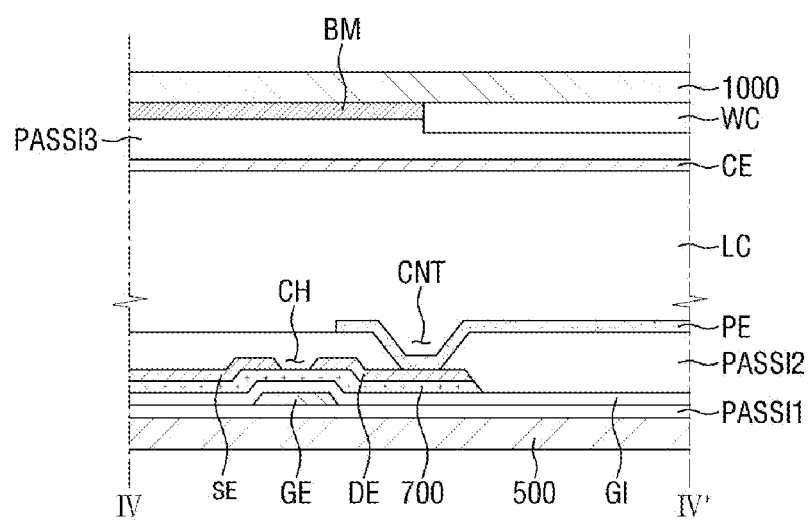
FIG. 4 is a cross-sectional view taken along the line IV-IV' in FIG. 2.

Referring to FIG. 2, the display panel DP may include a plurality of pixels PX. FIG. 4 is a cross-sectional view taken along line IV-IV' in FIG. 2. In an embodiment, one pixel PX may have a cross-sectional structure as shown in FIG. 4.

Referring to FIG. 4, a first substrate 500 is disposed. The first substrate 500 may be formed of a material having heat resistance and transparency. The first substrate 500 may be formed of, for example, transparent glass or plastic, but the present invention is not limited thereto.

A first passivation film PASSI1 may be disposed on the first substrate 500. The first passivation film PASSI1 may include an inorganic insulating material. For example, the first passivation film PASSI1 may be made of silicon oxide, silicon nitride, silicon oxynitride, aluminum oxynitride, titanium oxynitride, zirconium oxynitride, hafnium oxynitride, tantalum oxynitride, or tungsten oxynitride. However, this is illustrative, and the material of the first passivation film PASSI1 is not limited thereto.

The first passivation film PASSI1 is not essential, and may be omitted in other embodiments.

A gate electrode GE may be disposed on the first passivation film PASSI1. The gate electrode GE may constitute three terminals of a thin film transistor together with a source electrode SE and a drain electrode DE, which will be described later.

The gate electrode GE may include at least one of an aluminum (Al)-based metal including an aluminum alloy, a silver (Ag)-based metal including a silver alloy, a copper (Cu)-based metal including a copper alloy, a molybdenum (Mo)-based metal including a molybdenum alloy, chromium (Cr), titanium (Ti), and tantalum (Ta). However, this is illustrative and the material of the gate electrode GE is not limited thereto. A metal or polymer material having performance required to realize a desired display device may be used as the material of the gate electrode GE.

The gate electrode GE may have a single film structure, but is not limited thereto, and may be a double film, a triple film or a multiple film.

A gate insulating film GI may be disposed on the gate electrode GE. The gate insulating film GI may cover a gate wring GL and GE, and may be formed over the entire surface of the first substrate 500.

The gate insulating film GI may be formed of any one selected from inorganic insulating materials such as silicon oxides (SiOx) and silicon nitrides (SiNx), and organic insulating materials such as benzocyclobutene (BCB), acrylic materials, and polyimide, or may be formed of a mixture of two or more thereof. However, this is illustrative, and the material of the gate insulating film GI is not limited thereto.

A semiconductor pattern layer 700 may be disposed on the gate insulating layer GI.

The semiconductor pattern layer 700 may include amorphous silicon or polycrystalline silicon. However, the present invention is not limited thereto, and the semiconductor pattern layer 700 may include an oxide semiconductor.

The semiconductor pattern layer 700 may have various shapes such as an island shape and a linear shape. When the semiconductor pattern layer 700 has a linear shape, the semiconductor pattern layer 700 may be located under a data line (not shown) and extend to the top of the gate electrode GE.

In an embodiment, the semiconductor pattern layer 700 may be patterned in substantially the same shape as a data wiring (SE, DE) to be described later in all regions except for a channel portion CH.

In other words, the semiconductor pattern layer 700 may be disposed to overlap the data wiring (SE, DE) in all the regions except for the channel portion CH.

The channel portion CH may be disposed between a source electrode SE and a drain electrode DE, which face each other. The channel portion CH serves to electrically connect the source electrode SE and the drain electrode DE, and the specific shape thereof is not limited.

An ohmic contact layer (not shown) doped with n-type impurities in a high concentration may be disposed on the semiconductor pattern layer 700. The ohmic contact layer may overlap all or a part of the semiconductor pattern layer 700. However, in the embodiment in which the semiconductor pattern layer 700 includes an oxide semiconductor, the ohmic contact layer may be omitted.

When the semiconductor pattern layer 700 is an oxide semiconductor pattern layer, the semiconductor pattern layer 700 may include zinc oxide (ZnO). In addition, at least one ion selected from the group consisting of gallium (Ga), indium (In), stannum (Sn), zirconium (Zr), hafnium (Hf), cadmium (Cd), silver (Ag), copper (Cu), germanium (Ge), gadolinium, titanium (Ti), and vanadium (V) may be doped on the semiconductor pattern layer 700. Illustratively, the semiconductor pattern layer 700, which is an oxide semiconductor pattern layer, may include at least one selected from the group consisting of ZnO, ZnGaO, ZnInO, ZnSnO, GaInZnO, CdO, InO, GaO, SnO, AgO, CuO, GeO, GdO, HfO, TiZnO, InGaZnO, and InTiZnO. However, this is illustrative, and the kind of the oxide semiconductor is not limited thereto.

The data wiring (SE, DE) may be disposed on the semiconductor pattern layer 700. The data wiring (SE, DE) includes a source electrode SE and a drain electrode DE.

The drain electrode DE may be spaced apart from the source electrode SE, and may be disposed on the semiconductor pattern layer 700 to face the source electrode SE with respect to the gate electrode GE or the channel portion CH. The drain electrode DE may be in contact with a pixel electrode to be described later to be electrically connected thereto.

The data wiring (SE, DE) may have a single-layer structure or multi-layer structure made of nickel (Ni), cobalt (Co), titanium (Ti), silver (Ag), copper (Cu), molybdenum (Mo), aluminum (Al), beryllium (Be), niobium (Nb), iron (Fe), selenium (Se), or tantalum (Ta). In addition, an alloy, which is obtained by combining the above metal with at least one selected from the group consisting of titanium (Ti), zirconium (Zr), tungsten (W), tantalum (Ta), niobium (Nb), platinum (Pt), hafnium (Hf), oxygen (O), and nitrogen (N), may also be applied. However, the aforementioned materials are only illustrative, and the material of the data wiring (SE, DE) is not limited thereto.

A second passivation film PASSI2 may be disposed on the data wiring (SE, DE) and the semiconductor pattern layer 700. The second passivation film PASSI2 may be made of an inorganic insulating material or an organic insulating material.

The second passivation film PASSI2 may include a contact hole CNT exposing at least a part of the drain electrode DE.

A pixel electrode PE may be disposed on the second passivation film PASSI2. The pixel electrode PE may be electrically connected to the drain electrode DE through the contact hole CNT.

In an embodiment, the pixel electrode PE may be formed of a transparent conductor such as ITO (Indium Tin Oxide) or IZO (Indium Zinc Oxide) or a reflective conductor such as aluminum.

The second substrate 1000 may be disposed to face the first substrate 500. The second substrate 1000 may be formed of a material having heat resistance and transparency. The second substrate 1000 may be formed of, for example, transparent glass or plastic, but the present invention is not limited thereto.

A black matrix BM and a wavelength conversion layer WC may be disposed on the second substrate 1000.

The black matrix BM may overlap the aforementioned thin film transistor.

The black matrix BM can serve to block the light incident from the outside or block the light spread from the inside. For this purpose, the black matrix BM may be formed of a photosensitive resin containing a black pigment. However, this is illustrative, and the material of the black matrix is not limited thereto. Any material may be used as the material of the black matrix as long as it has properties necessary to block light incident from the outside.

The wavelength conversion layer WC may be disposed on a portion not covered with the black matrix BM, that is, a portion exposed by the black matrix BM. The wavelength conversion layer WC may convert the wavelength of light having passed through a liquid crystal layer LC to be described later. That is, the wavelength conversion layer WC may convert the wavelength of the light having passed through the liquid crystal layer LC, so that the light having passing through the wavelength conversion layer WC may have a specific color. In an embodiment, the wavelength conversion layer WC may include quantum dots.

In another embodiment, the wavelength conversion layer WC may be replaced with a color filter (not shown) that allows only the wavelength of a specific color to pass therethrough.

An overcoat film OC may be disposed on the wavelength conversion layer WC and the black matrix BM. The overcoat film OC may include an organic or inorganic insulating material. The overcoat film OC may be formed over the entire area of the second substrate 1000, and may function as a planarizing film.

A third passivation film PASSI3 may be disposed on the overcoat film OC. The third passivation film PASSI3 may be a planarizing film. A common electrode CE may be disposed on the third passivation film PASSI3. The common electrode CE may be a non-patterned front electrode. A common voltage may be applied to the common electrode CE. When different voltages are applied to the common electrode CE and the pixel electrode PE, a constant electric field may be formed between the common electrode CE and the pixel electrode PE.

A liquid crystal layer LC including a plurality of liquid crystal molecules may be disposed between the first substrate 500 and the second substrate 1000. The liquid crystal layer LC may be controlled by an electric field formed between the common electrode CE and the pixel electrode PE, and light necessary for displaying an image may be controlled by controlling the movement of the liquid crystal molecules disposed in the liquid crystal layer LC.

In an embodiment, the display panel DP may further include a polarizing layer. The polarizing layer may include a first polarizing layer POL1 and a second polarizing layer POL2.

The first polarizing layer POL1 may polarize light provided from the light source LS. Specifically, the first polarizing layer POL1 may transmit only light vibrating in a specific direction among the light provided from the light source LS, and may absorb or reflect the remaining light. In an embodiment, the first polarizing layer POL1 may be a polarizing film on which a polymer resin stretched in a specific direction and a light-absorbing material absorbing light vibrating in a specific direction are adsorbed.

The second polarizing layer POL2 may polarize light having passed through the liquid crystal layer LC. Specifically, the second polarizing layer POL2 may transmit only light vibrating in a specific direction among the light having passed through the liquid crystal layer LC, and may reflect the remaining light.

The vibration direction of the light transmitted through the second polarizing layer POL2 may be the same as or different from the vibration direction of the light transmitted through the first polarizing layer POL1. For example, in an exemplary embodiment in which the first polarizing layer POL1 transmits light vibrating in a first direction, the second polarizing layer POL2 may transmit light vibrating in the first direction, or may transmit light vibrating in a second direction different from the first direction (for example, a direction perpendicular to the first direction).

Although FIG. 3 illustrates a case where the first polarizing layer POL1 and the second polarizing layer POL2 are disposed outside the first substrate 500 and the second substrate 1000, the positions of the first polarizing layer POL1 and the second polarizing layer POL2 are not limited thereto.

In another embodiment, the first polarizing layer POL1 and the second polarizing layer POL2 may be disposed inside the first substrate 500 and the second substrate 1000, that is, between the first substrate 500 and the second substrate 1000.

In this case, each of the first polarizing layer POL1 and the second polarizing layer POL2 may be a polarizing layer to which a wire grid polarizer (WGP) is applied.

Referring to FIGS. 2 and 3, the display device DD may include a top chassis TC. The top chassis TC may be disposed to surround the display panel DP.

In an embodiment, the top chassis TC may surround the side surface of the display panel DP, and may expose the front surface of the display panel DP. Further, the top chassis TC may extend in the z-axis direction in FIG. 3, and thus may not overlap the display panel DP.

That is, the top chassis TC does not cover the rim of the display panel DP, thereby eliminating or minimizing a bezel space disposed at the outer periphery of the display device DD.

In an embodiment, the top chassis TC may include a first sub-top chassis TC1, a second sub-top chassis TC2, a third sub-top chassis TC3 and a fourth sub-top chassis TC4.

The first sub-top chassis TC1 may face the first side surface S1, the second sub-top chassis TC2 may face the second side surface S2, the third sub-top chassis TC3 may face the third side surface S3, and the fourth sub-top chassis TC4 may face the fourth side surface S4.

In an embodiment, the first sub-top chassis TC1, the second sub-top chassis TC2, the third sub-top chassis TC3, and the fourth sub-top chassis TC4 may be independently formed, and then coupled.

Specifically, the first sub-top chassis TC1, the second sub-top chassis TC2, the third sub-top chassis TC3, and the fourth sub-top chassis TC4, which are separated from each other, may be coupled with a bottom chassis BC.

Accordingly, the first sub-top chassis TC1, the second sub-top chassis TC2, the third sub-top chassis TC3, and the fourth sub-top chassis TC4 may be connected to each other.

In another embodiment, two or more selected from the first sub-top chassis TC1, the second sub-top chassis TC2, the third sub-top chassis TC3 and the fourth sub-top chassis TC4 may be integrally formed.

The first sub-top chassis TC1, the second sub-top chassis TC2, the third sub-top chassis TC3, and the fourth sub-top chassis TC4 may press and fix the side surfaces of the display panel DP.

The first sub-top chassis TC1, the second sub-top chassis TC2, the third sub-top chassis TC3, and the fourth sub-top chassis TC4 may be attached to the display panel DP by a first adhesive layer AD1 and a second adhesive layer AD2.

Each of the first adhesive layer AD1 and the second adhesive layer AD2 may include a polymer resin or an adhesive tape. That is, any material may be used as the material of the first adhesive layer AD1 or the second adhesive layer AD2 as long as it has an adhesion function.

In an embodiment, the second sub-top chassis TC2 and the second side surface S2 may be attached to each other by the first adhesive layer AD1.

As described above, the second side surface S2 may include the first substrate 500 and the second substrate 1000, which are aligned with each other. Although will be described later in detail in a process to be described later, the attaching of the second side surface S2 and the second sub-top chassis TC2 may be performed in such a manner that the second side surface S2 and the second sub-top chassis TC2 are pressed in a state where the second sub-top chassis TC2 is coated with the first adhesive layer AD1.

In this case, the first adhesive layer AD1 may be at least partially interposed between the second side surface S2 and the second sub-top chassis TC2.

The fourth side surface S4, similarly to the second side surface S2, may also include the first substrate 500 and the second substrate 1000, which are aligned with each other. Accordingly, the fourth side surface S4 and the fourth sub-top chassis TC4 may also be attached to each other by the first adhesive layer AD1.

That is, the first adhesive layer AD1 may be at least partially interposed between the fourth side surface S4 and the fourth sub-top chassis TC4.

The first side surface S1 may be formed of only the first substrate 500, as described above. The attaching of the first side surface S1 and the first sub-top chassis TC1 may be performed in such a manner that the second adhesive layer AD2 is applied onto the first pad portion PP1 in a state where the first side surface S1 and the first sub-top chassis TC1 are in contact with each other. Accordingly, unlike the first adhesive layer AD1, the second adhesive layer AD2 may not be interposed between the first side surface S1 and the first sub-top chassis TC1.

The attaching method of the third side surface S3 may be substantially the same as that of the first side surface S1. That is, the third side surface S3 may be formed of only the first substrate 500.

Thus, the attaching of the third side surface S3 and the third sub-top chassis TC3 may be performed in such a manner that the second adhesive layer AD2 is applied onto the second pad portion PP2 in a state where the third side surface S3 and the third sub-top chassis TC3 are in contact with each other. Accordingly, unlike the first adhesive layer AD1, the second adhesive layer AD2 may not be interposed between the third side surface S3 and the third sub-top chassis TC3.

Figure 5:
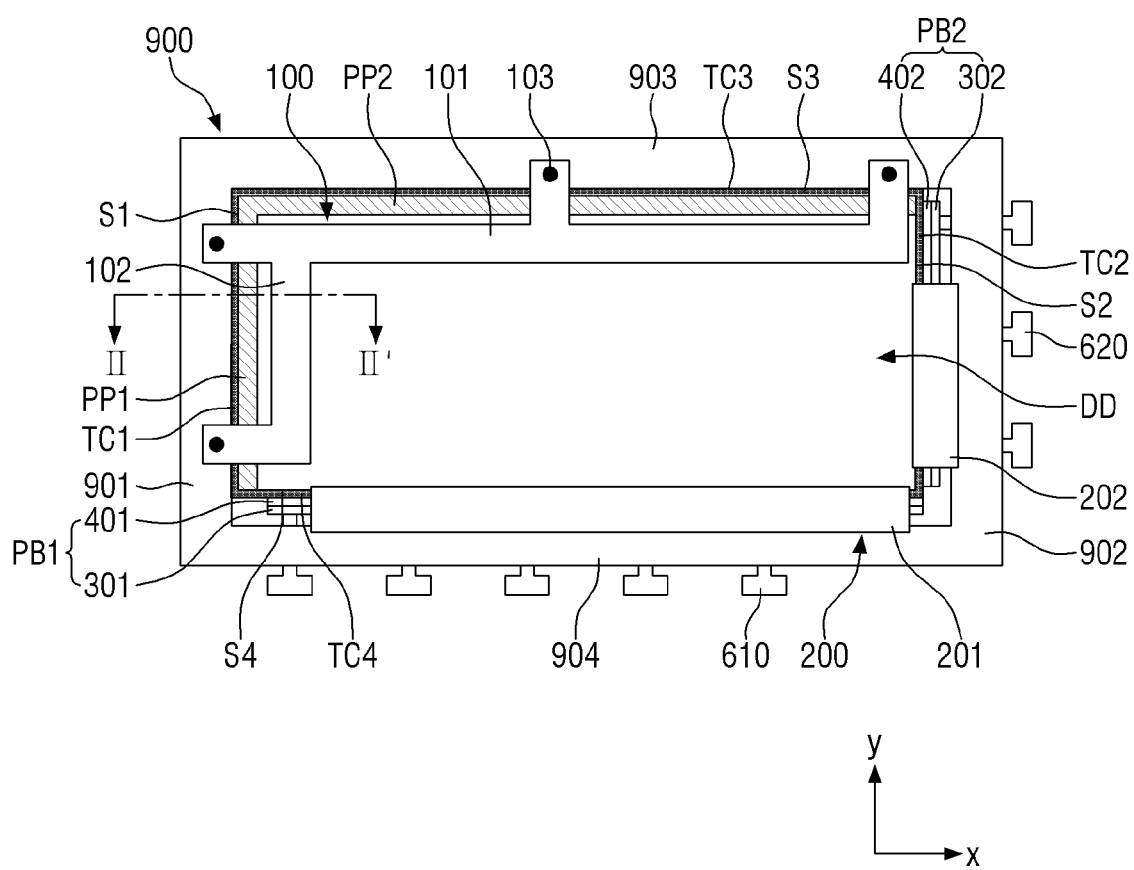
FIG. 5 is a plan view of a jig assembly according to an embodiment of the present invention.

FIG. 5 is a plan view of a jig assembly according to an embodiment of the present invention.

Figure 6:
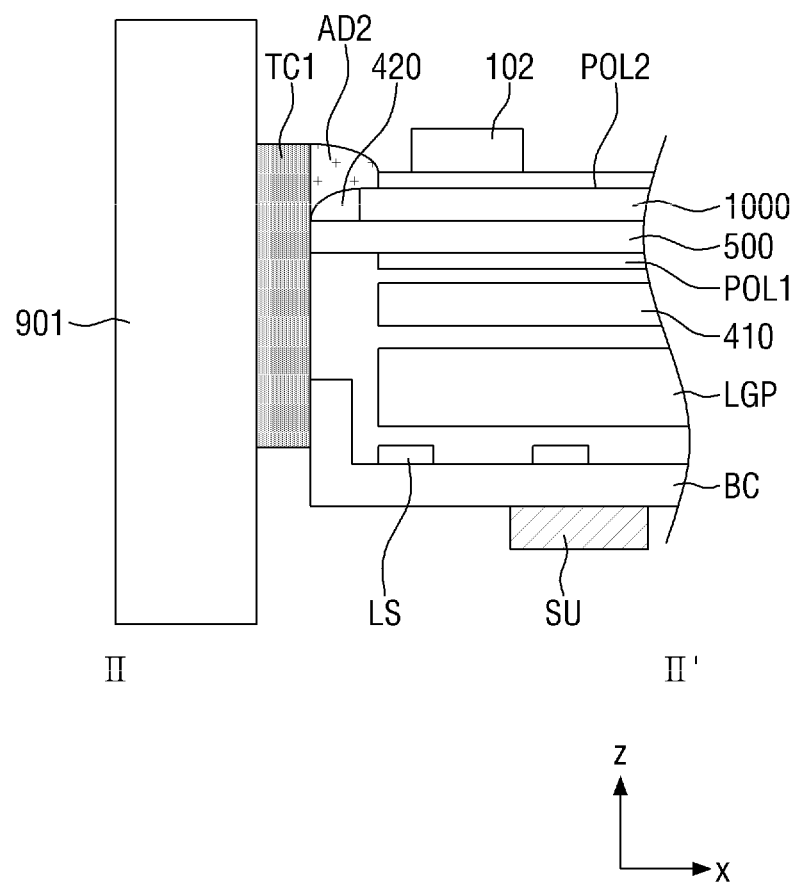
FIG. 6 is a cross-sectional view taken along the line II-II' in FIG. 5.

FIG. 5 shows a state in which the display device DD is fixed to the jig assembly. FIG. 6 is a cross-sectional view taken along the line II-II' in FIG. 5.

Referring to FIGS. 5 and 6, the side surface of the display device DD may be supported by the outer frame 900, the first pressure bar PB1 and the second pressure bar PB2.

Specifically, the first sub-top chassis TC1 may be supported by the first sub-outer frame 901, and the third sub-top chassis TC3 may be supported by the third sub-outer frame 903.

Further, the second sub-top chassis TC2 may supported by the second pressure bar PB2, and the fourth sub-top chassis TC4 may be supported by the first pressure bar PB1. As described above, the first pressure bar PB1 and the second pressure bar PB2 may press a target object.

Specifically, the first pressure bar PB1 may press the fourth sub-top chassis TC4 in the positive y-axis direction, and the second press bar PB2 may press the second sub-top chassis TC2 in the negative x-axis direction. Thus, the display device DD may be firmly fixed by the first sub-outer frame 901, the third sub-outer frame 903, the first pressure bar PB1, and the second pressure bar PB2.

Further, the lower portion of the display device DD may be supported by the support SU.

Referring to FIG. 6, the bottom chassis BC of the display device DD is in contact with the support SU to support the display device DD in the z-axis direction.

The upper portion of the display device DD may be supported by the fixed cover 200 and the movable cover 100.

Specifically, the first sub-fixed cover 201 may be in contact with the upper portion of the display panel DP adjacent to the fourth side surface S4 to fix the display panel DP. Similarly, the second sub-fixed cover 202 may be in contact with the display panel DP adjacent to the second side surface S2 to fix the display panel DP.

That is, the first sub-fixed cover 201 and the second sub-fixed cover 202 may fix the display device DD by pressing the display device DD in the negative z-axis direction.

The upper portion of the display device DD may also be fixed by the movable cover 100.

Specifically, the first sub-movable cover 101 may be in contact with the upper portion of the display panel DP adjacent to the third side surface S3 to fix the display device DD. Similarly, the second sub-movable cover 102 may be in contact with the upper portion of the display panel DP adjacent to the first side surface S1 to fix the display device DD.

In an embodiment, the first sub-movable cover 101 and the second sub-movable cover 102 may be disposed on a region where the first substrate 500 and the second substrate 1000 overlap each other. That is, the first sub-movable cover 101 and the second sub-movable cover 102 may simultaneously overlap the first substrate 500 and the second substrate 1000.

As described above, the movable cover 100 may be detachably coupled.

That is, the display device DD may be disposed in the hollow portion HP of the jig assembly in a state where the movable cover 100 is detached. That is, the display device DD is inserted into the fixed cover 200 by tilting the display device DD toward the inside of the fixed cover 200, and then the movable cover 100 is attached to the fixed cover 200, thereby completely fixing the display device DD.

Figure 7:
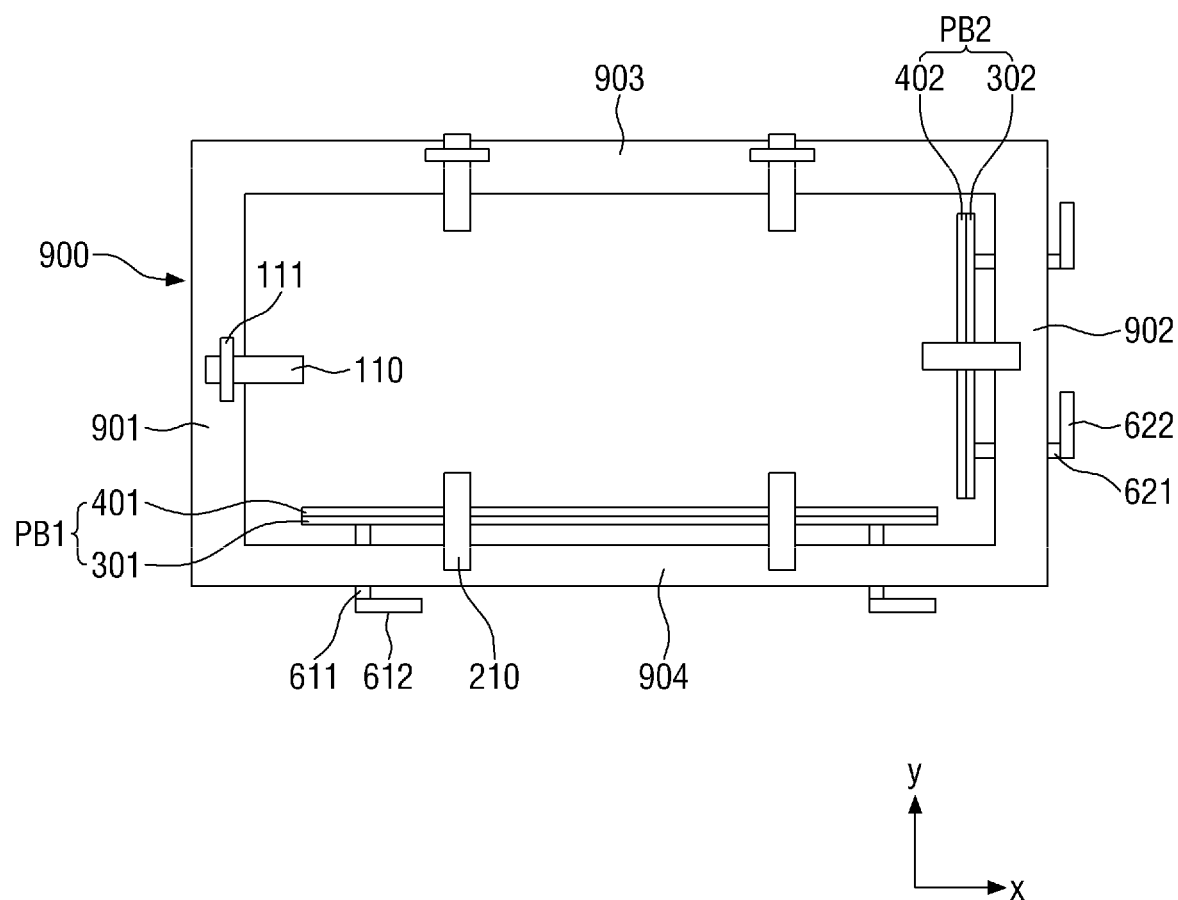
FIG. 7 is a plan view of a jig assembly according to another embodiment of the present invention.

FIG. 7 is a plan view of a jig assembly according to another embodiment of the present invention.

Referring to FIG. 7, in an embodiment, a movable cover 110 and a fixed cover 210 may be formed as a finger type.

Specifically, the fixed cover 210 has a bar shape extending in the length direction, and one end of the fixed cover 210 is disposed in the hollow portion HP. accordingly, one end of the fixed cover 210 may press the upper portion of a target object.

A plurality of fixed covers 210 may be disposed. The fixed cover 210 disposed on the fourth sub-outer frame 904 may extend in the y-axis direction. Further, the fixed cover 210 disposed on the second sub-outer frame 902 may extend in the x-axis direction. Accordingly, ends of the plurality of fixed covers 210 may be disposed in the hollow portion HP, and may be in contact with the upper portion of a target object (for example, a display device) to fix the target object.

A plurality of movable covers 110 may be disposed. In an embodiment, the movable cover 110 may be coupled with a hinge 111. Accordingly, the movable cover 110 may be coupled with the hinge 111 to be opened or closed.

That is, the movable cover 110 may have an open mode and a closed mode.

In the open mode, the movable cover 110 rotates about the hinge 111 and ascends. Thus, a space for a target object to be inserted into the hollow portion HP can be secured.

In the closed mode, the movable cover 110 rotates about the hinge 111 and descends. Thus, one end of the movable cover 110 is disposed on the hollow portion HP, and is in contact with the upper portion of a target object to press the target object.

In an embodiment, the first pressure bar PB1 may be coupled with a first moving pin 611 and a first moving lever 612.

The first moving pin 611 may penetrate the outer frame 900 to be connected to the first pressure bar PB1. The first moving lever 612 may rotate counterclockwise or clockwise. As the first moving lever 612 rotates, the first moving pin 611 may move forward or backward. When the first moving screw 610 is replaced with the first moving lever 612 and the first moving pin 611 as described above, the first pressure bar PB1 can be easily driven.

Similarly, the second pressure bar PB2 may be coupled with a second moving pin 621 and a second moving lever 622. The second moving pin 621 may penetrate the outer frame 900 to be connected to the second pressure bar PB2. The second moving lever 622 may rotate counterclockwise or clockwise. As the second moving lever 622 rotates, the second moving pin 621 may move forward or backward. When the second moving screw 620 is replaced with the second moving lever 622 and the second moving pin 621 as described above, the second pressure bar PB2 can be easily driven.

Hereinafter, a method of manufacturing a display device according to an embodiment of the present invention will be described. Since some of the configurations described below may be the same as those of the display device according to some embodiments of the present invention, descriptions of some configurations may be omitted to avoid duplicate descriptions.

Figure 8:
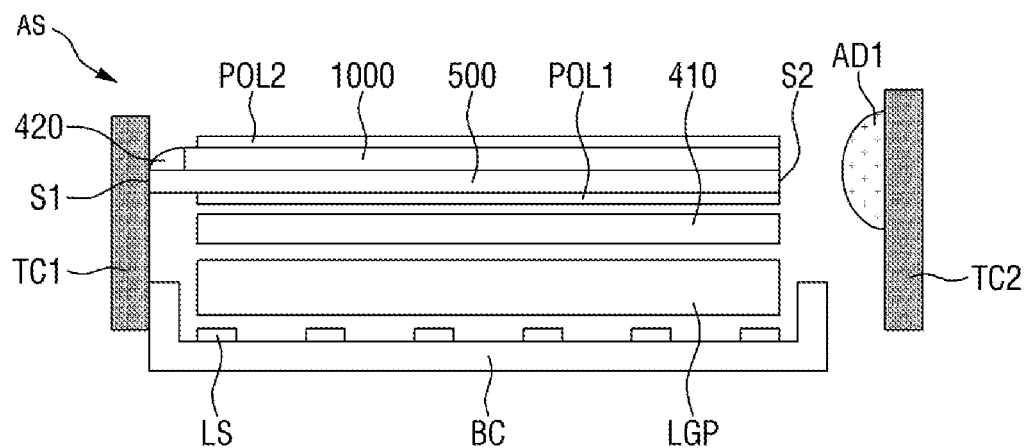
FIG. 8 is a cross-sectional view for explaining a method of manufacturing a display device according to an embodiment of the present invention.
Figure 9:
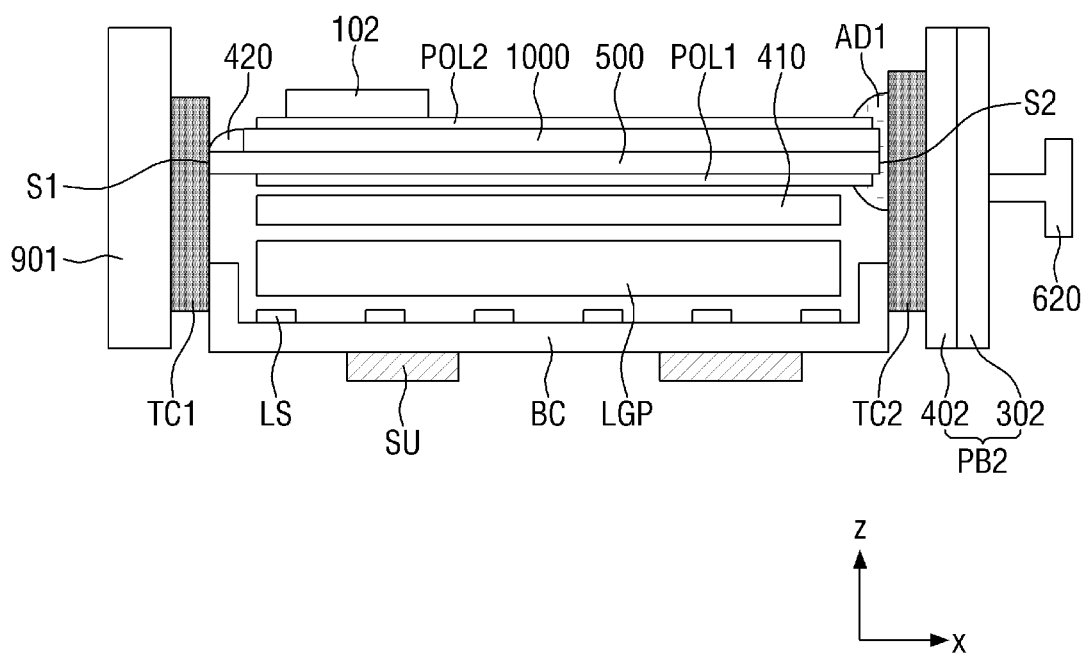
FIG. 9 is a cross-sectional view for explaining a method of manufacturing a display device according to an embodiment of the present invention.
Figure 10:
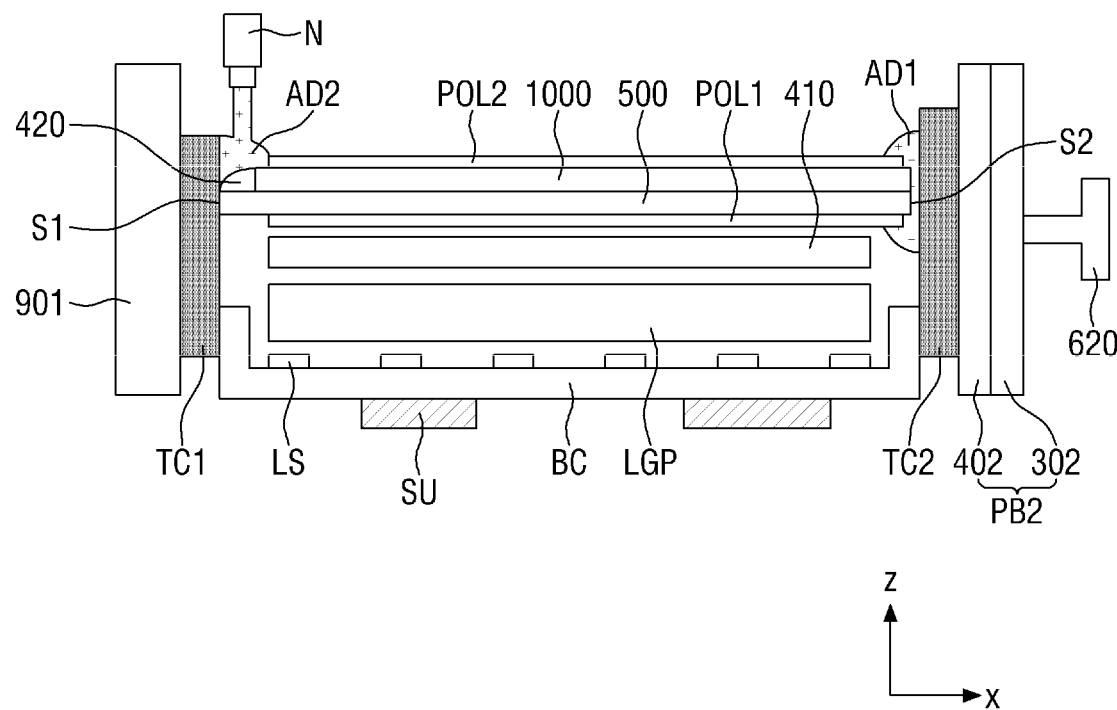
FIG. 10 is a cross-sectional view for explaining a method of manufacturing a display device according to an embodiment of the present invention.
Figure 11:
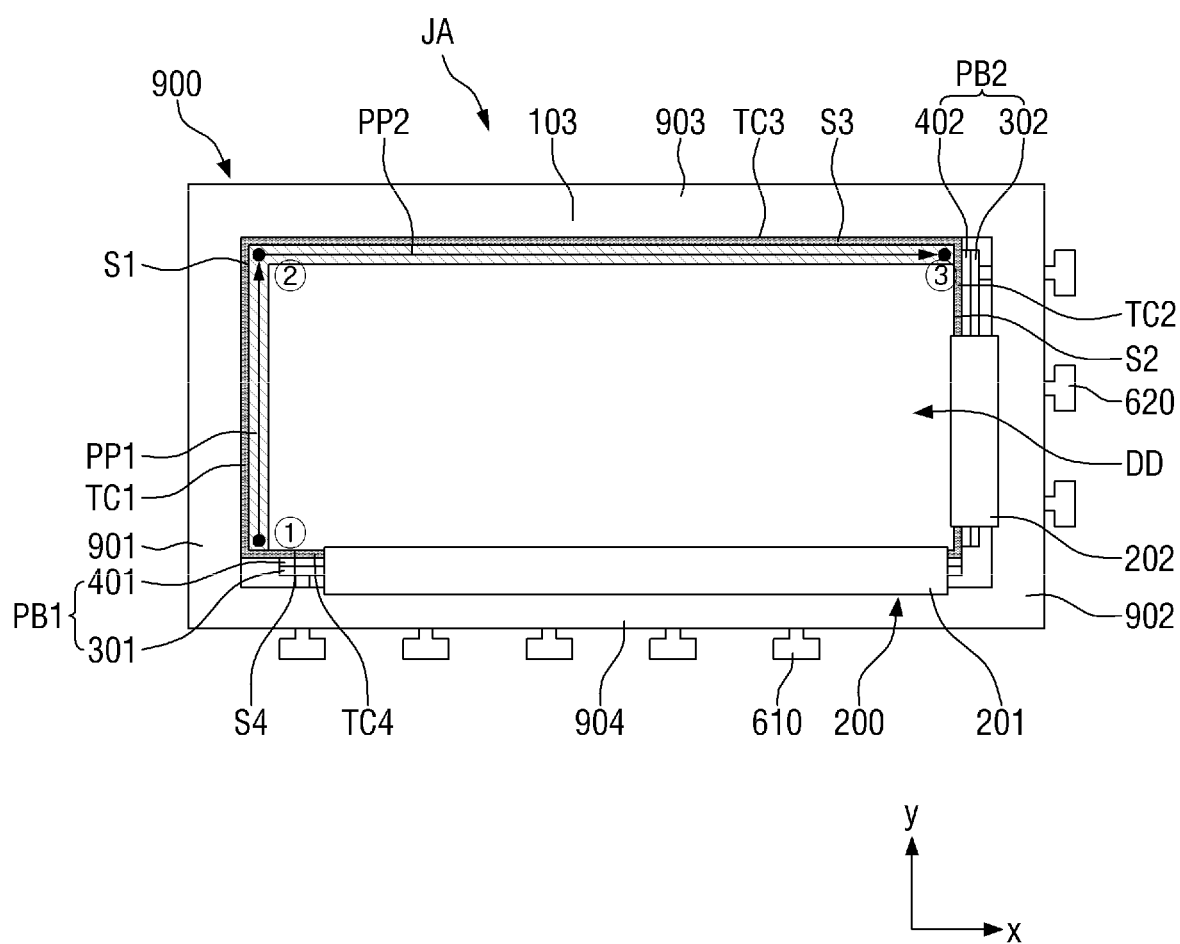
FIG. 11 is a plan view for explaining a method of manufacturing a display device according to an embodiment of the present invention.
Figure 12:
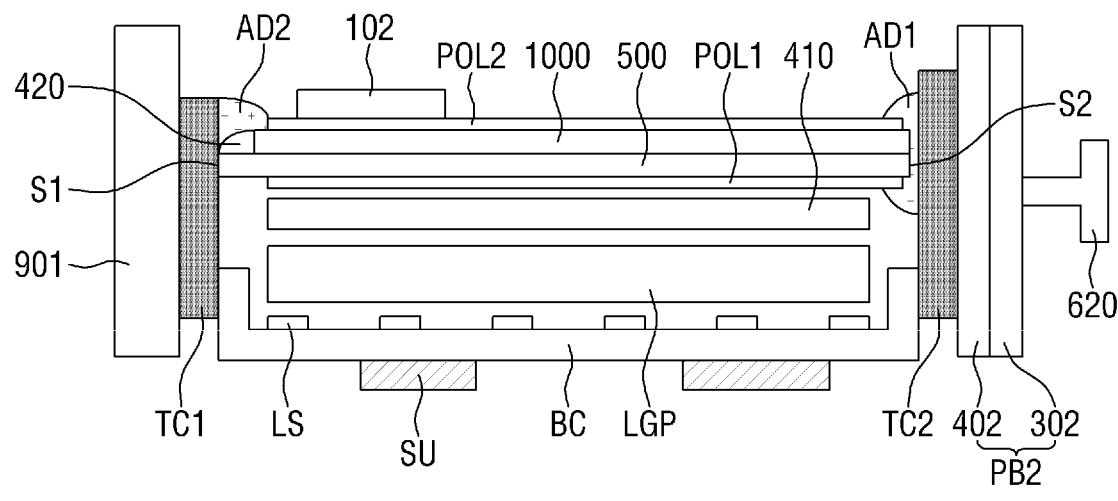
FIG. 12 is a cross-sectional view for explaining a method of manufacturing a display device according to an embodiment of the present invention.

FIG. 8 is a cross-sectional view for explaining a method of manufacturing a display device according to an embodiment of the present invention. FIG. 9 is a cross-sectional view for explaining a method of manufacturing a display device according to an embodiment of the present invention. FIG. 10 is a cross-sectional view for explaining a method of manufacturing a display device according to an embodiment of the present invention. FIG. 11 is a plan view for explaining a method of manufacturing a display device according to an embodiment of the present invention. FIG. 12 is a cross-sectional view for explaining a method of manufacturing a display device according to an embodiment of the present invention.

Referring to FIGS. 8 and 12, a method of manufacturing a display device according to an embodiment of the present invention includes the steps of: preparing an assembly AS including a display panel DP and a first sub-top chassis TC1 disposed on a first side surface S1 of the display panel DP; forming a first adhesive layer AD1 on a second sub-top chassis TC2; attaching the second sub-top chassis TC2 to a second side surface S2; fixing the assembly AS provided with the second sub-top chassis TC2 using a jig assembly JA; curing the first adhesive layer AD1; detaching a movable cover 100 in a state where the assembly AS and the jig assembly JA are fixed; forming a second adhesive layer AD2 on the first side surface S1 of the display panel DP; and attaching the movable cover 100 and curing the second adhesive layer AD2.

Referring to FIG. 8, the step of preparing an assembly AS including a display panel DP and a first sub-top chassis TC1 disposed on a first side surface S1 of the display panel DP may proceed. In this step, the assembly AS may include a bottom chassis BC, a light source LS, an optical function layer 410, a display panel DP, a first sub-top chassis TC1, and a third sub-top chassis TC3. That is, in this step, the first sub-top chassis TC1 may be in contact with the first side surface S1, and the third sub-top chassis TC3 may be in contact with the third side surface S3.

Also, as described above, the first sub-top chassis TC1 and the third sub-top chassis TC3 may be coupled with the bottom chassis BC.

Subsequently, the step of forming a first adhesive layer AD1 on a second sub-top chassis TC2 may proceed. The first adhesive layer AD1 may be formed by applying an adhesive material to the second sub-top chassis TC2. The first adhesive layer AD1 may be formed along a extending direction of the second side surface S2 (y-axis direction in FIG. 1).

Subsequently, the step of attaching the second sub-top chassis TC2 to the second side surface S2 may proceed. Specifically, the second sub-top chassis TC2 may be coupled with the bottom chassis BC to attach the second sub-top chassis TC2 to the second side surface S2. In this case, as described above, the first adhesive layer AD1 may be at least partially interposed between the second sub-top chassis TC2 and the second side surface S2.

Subsequently, although not shown in the drawing, the step of attaching a fourth sub-top chassis TC4 to a fourth side surface S4 may proceed. The step of attaching the fourth sub-top chassis TC4 to the fourth side surface S4 may be substantially the same as the step of attaching the second sub-top chassis TC2 to the second side surface S2.

Specifically, the fourth sub-top chassis TC4 may be coupled with a bottom chassis BC to attach the fourth sub-top chassis TC4 to the fourth side surface S4. In this case, as described above, the first adhesive layer AD1 may be at least partially interposed between the fourth sub-top chassis TC4 and the fourth side surface S4.

Subsequently, referring to FIG. 9, the step of fixing the assembly AS provided with the second sub-top chassis TC2 using a jig assembly JA may proceed.

The assembly AS provided with the second sub-top chassis TC2 and the fourth sub-top chassis TC4 may be substantially the same as the aforementioned display device DD. That is, as described above with reference to FIG. 5, the display device DD and the jig assembly JA may be coupled with each other. Specifically, the display device DD may be disposed in the hollow portion HP of the jig assembly JA in a state where the movable cover 100 is detached, and the movable cover 100 may be attached thereto.

Subsequently, the step of pressing the fourth sub-top chassis TC4 and the second sub-top chassis TC2 with the first pressure bar PB1 and the second pressure bar PB2 may proceed. The first pressure bar PB1 may press the fourth sub-top chassis TC4. Thus, the fourth sub-top chassis TC4 and the fourth side surface S4 may be brought into closer contact with each other. Similarly, the second pressure bar PB2 may press the second sub-top chassis TC2. Thus, the second sub-top chassis TC2 and the second side surface S2 may be brought into closer contact with each other.

Subsequently, the step of curing the first adhesive layer AD1 may proceed. The curing of the first adhesive layer AD1 may be performed by any one or more of drying, baking, and ultraviolet irradiation.

Subsequently, referring to FIGS. 10 and 11, the step of detaching the movable cover 100 in a state where the assembly AS and the jig assembly JA are fixed may proceed.

Even if the movable cover 100 is detached, the assembly AS may still be fixed to the jig assembly JA. The step of forming a second adhesive layer AD2 on the first side surface S1 and third side surface S3 of the display panel DP in a state where the movable cover 100 is detached may proceed.

The second adhesive layer AD2 may be formed by applying an adhesive material onto the first side surface S1 and the third side surface S3. Thus, the second adhesive layer AD2 may at least partially overlap a first pad portion PP1 and a second pad portion PP2. When the movable cover 100 is detached, the first pad portion PP1 and the second pad portion PP2 are completely exposed, so that a nozzle N is disposed over the first pad portion PP1 and the second pad portion PP2 to form the second adhesive layer AD2.

The second adhesive layer AD2 may attach the display panel DP to the first sub-top chassis TC1 and the third sub-top chassis TC3. Since the second adhesive layer AD2 is formed in a state where the first sub-top chassis TC1 and the third sub-top chassis TC3 are in contact with the display panel DP, the second adhesive layer AD2 may not be interposed between the first side surface S1 and the first sub-top chassis TC1 and between the third side surface S3 and the third sub-top chassis TC3.

The application of the second adhesive layer AD2 may be continuously performed from ① to ③ via ②. However, this process is illustrative, and the present invention is not limited thereto. This process may be performed reversely or intermittently.

Subsequently, referring to FIG. 12, the step of attaching the movable cover 100 and curing the second adhesive layer AD2 may proceed. The curing of the second adhesive layer AD2 may be performed by any one or more of drying, baking, and ultraviolet irradiation.

As in the embodiment of the present invention, when the second adhesive layer AD2 is formed by releasing only the movable cover 100 without completely separating the assembly AS from the jig assembly JA, the step of separating the jig assembly and the step of recombining the jig assembly can be omitted, thereby simplifying a process.

In addition, it is possible to prevent the assembly AS from shaking in the process step, so as to prevent the occurrence of defective coating due to defective alignment.

As described above, according to embodiments of the present invention, a process can be simplified by omitting several steps of the process.

Further, a display device having a narrow bezel can be realized.

The effects of the present invention are not limited by the foregoing, and other various effects are anticipated herein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A jig assembly for manufacturing a display device, comprising:
an outer frame in which a hollow portion is defined;
a support disposed across the hollow portion;
a movable cover coupled with the outer frame;
a fixed cover directly fixed to the outer frame; and
a pressure bar disposed inside the outer frame, the pressure bar being movable toward a center of the hollow portion in a plan view.

2. The jig assembly of claim 1,
wherein the fixed cover overlaps the outer frame and the hollow portion in a plan view.

3. The jig assembly of claim 1,
wherein the movable cover is detachably coupled to the outer frame.

4. The jig assembly of claim 1,
wherein the pressure bar at least partially overlaps the fixed cover in a plan view.

5. The jig assembly of claim 1, further comprising a moving screw penetrating the outer frame,
wherein the moving screw is engaged with the pressure bar to move the pressure bar.

6. The jig assembly of claim 5,
wherein the pressure bar includes a supporting portion engaged with the moving screw and a cushion portion disposed on the supporting portion and made of an elastic material.

7. The jig assembly of claim 1,
wherein the outer frame includes a first sub-outer frame and a second sub-outer frame, each extending in a y-axis direction and facing each other, and a third sub-outer frame and a fourth sub-outer frame, each extending in an x-axis direction and facing each other.

8. The jig assembly of claim 7,
wherein the movable cover includes a first sub-movable cover and a second sub-movable cover, and
the first sub-movable cover is detachably coupled with the third sub-outer frame, and the second sub-movable cover is detachably coupled with the first sub-outer frame.

9. The jig assembly of claim 8,
wherein the fixed cover includes a first sub-fixed cover and a second sub-fixed cover, and
the first sub-fixed cover is directly coupled with the fourth sub-outer frame, and the second sub-fixed cover is directly coupled with the second sub-outer frame.

10. The jig assembly of claim 8, wherein the first sub-movable cover and the second sub-movable cover are connected to each other.

11. The jig assembly of claim 10, wherein the first sub-movable cover and the second sub-movable cover are formed in one piece.

12. The jig assembly of claim 8, wherein the first sub-movable cover and the second sub-movable cover have a bar shape and overlap the outer frame and the hollow portion.

13. The jig assembly of claim 7, further comprising:
a moving pin penetrating the outer frame and connected with the pressure bar; and
a moving lever connected with the moving pin.

14. The jig assembly of claim 13,
wherein, when the moving lever rotates, the moving pin moves forward or backward to move the pressure bar.

15. The jig assembly of claim 1,
wherein the pressure bar includes a first pressure bar moving along a first direction and a second pressure bar moving along a second direction perpendicular to the first direction.

* * * * *